United States Patent [19]

Rodi

[11] 3,925,719

[45] Dec. 9, 1975

[54] CIRCUIT FOR SELECTING AN EXTREME VALUE

[75] Inventor: Anton Rodi, St. Ilgen, Germany

[73] Assignee: Teldix GmbH, Heidelberg, Germany

[22] Filed: July 19, 1974

[21] Appl. No.: 489,900

Related U.S. Application Data

[63] Continuation-in-part of Ser. No. 348,262, April 4, 1973, abandoned.

[30] Foreign Application Priority Data

Apr. 5, 1972 Germany ............................ 2216322

[52] U.S. Cl. .................. 323/16; 307/235 A; 323/23

[51] Int. Cl.$^2$ ....................... B60T 8/02; G01R 19/00

[58] Field of Search ............. 307/72, 75, 85, 86, 87, 307/109, 110, 249, 235 R, 235 A; 323/16, 19, 22 T, 23, 25, 43.5 S

[56] References Cited

UNITED STATES PATENTS

| | | | |
|---|---|---|---|
| 2,810,081 | 10/1957 | Elliott | 307/249 |
| 3,001,088 | 9/1961 | Jochems et al. | 323/23 UX |
| 3,358,157 | 12/1967 | Shearme | 307/235 |
| 3,514,688 | 5/1970 | Martin | 323/43.5 S |
| 3,526,785 | 9/1970 | Biri | 307/235 |
| 3,667,057 | 5/1972 | Pfersch et al. | 307/235 X |

FOREIGN PATENTS OR APPLICATIONS

| | | | |
|---|---|---|---|
| 178,298 | 2/1962 | Sweden | 307/249 |

OTHER PUBLICATIONS

Beesley et al., High-Current Low-Voltage Regulated Power Supply, IBM Tech. Disc. Bulletin, Vol. 13, No. 12, May 1971, p. 3872.

*Primary Examiner*—A. D. Pellinen
*Attorney, Agent, or Firm*—Spencer & Kaye

[57] ABSTRACT

A circuit for selecting an extreme value from at least two potentials present on different conductors composed of a transistor coupling each of the conductors to an output conductor by its collector-emitter path, the transistors having a larger current gain when conducting in normal operation than when conducting in inverted operation, the bases of the transistors being connected to a potential such that all transistors remain switched on while the transistor carrying the extreme value is operated normally and the other transistor or transistors is or are operated inversely.

5 Claims, 4 Drawing Figures

CIRCUIT FOR SELECTING AN EXTREME VALUE

CROSS-REFERENCE TO RELATED APPLICATION

This application is a continuation-in-part of my pending application Ser. No. 348,262, filed Apr. 4, 1973, entitled "CIRCUIT FOR SELECTING AN EXTREME VALUE", and now abandoned.

BACKGROUND OF THE INVENTION

The invention relates to a circuit for selecting an extreme value from at least two potentials present on different conductors, these potentials having the same polarity and the polarity being unchanging, in which the incoming conductors having the different potentials are connected to the outgoing conductor by means of semiconductor elements.

It is known to use diodes as semiconductor elements, the greatest or smallest potential inputs being coupled to the outgoing conductor depending on the circuit arrangement of the diodes. This expression is not, however, in fact correct in the case of the known circuit because, in reality, only the extreme value minus a voltage drop of about 0.7V occurring at the diodes is coupled to the outgoing conductor. The potential coupled at the outgoing conductor is thus no longer exactly proportional to the extreme value of the incoming potentials, but is inaccurate, the inaccuracy increasing as the extreme value becomes smaller. This inaccuracy is not admissable in many applications.

SUMMARY OF THE INVENTION

It is an object of the invention to provide a circuit in which this inaccuracy can be reduced or avoided to a large extent, that is to say no large voltage drop occurs at the semiconductor component by which the extreme value is coupled.

According to the invention, there is provided a circuit for selecting an extreme value from at least two potentials present on different input conductors comprising a plurality of transistors having an amplification factor greater in the normal direction than in the inverse direction, an output conductor, means for connecting the emitter-collector path of each said transistor between one of said input conductors and said output conductor, means for connecting a potential to the bases of said transistor to cause normal operation of said transistor carrying the desired extreme value and to cause inverse operation of the remaining one or more of said transistors.

BRIEF DESCRIPTION OF THE DRAWINGS

The invention will now be described in greater detail, by way of example, with reference to the drawings in which.

DESCRIPTION OF THE PREFERRED EMBODIMENTS

Figure 1:
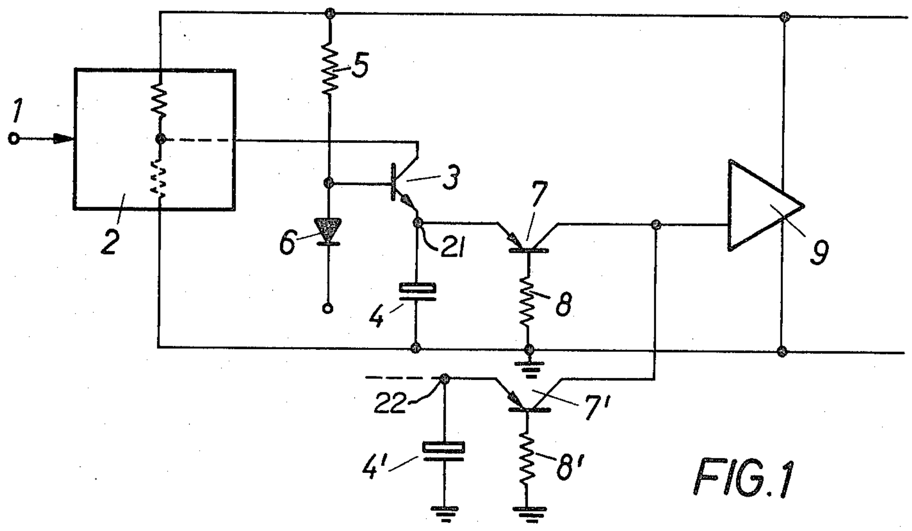
FIG. 1 is a circuit diagram for one form of a circuit in accordance with the invention for use in an anti-lock controller for vehicle brakes.

Basically the invention provides that the emitter-collector path of a transistor is connected between each input conductor and an output conductor, the current gain of the transistor being smaller in inverted operation, i.e. inverted alpha ($\alpha_I$) than in normal operation, i.e. normal alpha ($\alpha_N$) and the connection of this path as well as the selection of the potential to which the base of the transistor is connected through a resistance being selected in dependence on the required extreme value, in such a manner that all transistors remain conducting, or switched on during circuit operation, while the transistor through the emitter-collector path of which the required extreme value is coupled to the conductor, is operated normally and the other transistor or transistors are operated inversely.

For any one of the transistors to be in its conducting, or switched-on, state, its emitter-base junction must be forward biassed, or it could perhaps be more accurately stated that its emitter-base junction must not be reverse-biassed.

It is a basic feature of the present invention that while the circuit is in operation so that a potential is present on each input conductor of the circuit, the polarity and amplitude of the potential applied to the emitter of each transistor, and the voltage at the transistor base, will be such that the emitter-base junction of each transistor will at all times be, forward biassed and hence every transistor will be continuously switched on. A necessary condition for achieving this transistor state is that the conductivity type of each emitter be of the same polarity as the potentials present on the input conductors, relative to the corresponding base potentials.

To this end, the circuit is designed so that whenever it is in operation the potential at the emitter of each transistor will vary within a given range and the base of each transistor is connected to always be at a potential such that when the potential at its emitter has any value within such given range the collector-emitter junction will be biassed so as to maintain the transistor switched-on, or conductive. This switched-on state exists independently of the collector-base junction bias.

All of the potentials applied to the emitters of all of the transistors have the same polarity and the sign of this polarity does not change during operation, or successive operations of the circuit.

The lower limit of the range over which each input potential can vary can be based on the range over which it is desired to have the potential vary but can be no lower than a value at which the transistor can no longer reliably remain switched on. The upper limit of the potential range need be selected only so as to prevent exceeding the permissible base current and breakdown voltages of the transistors.

Thus when a potential within the selected range is applied to each emitter, the highest or lowest input potential is coupled to the outgoing conductor in dependence on the connection of the individual emitter-collector paths. The inaccuracy of the output potential is very low, since only a very slight voltage drop, which is dependent on the current and on the collector-emitter resistance, occurs at the emitter-collector path of the coupling element. a prerequisite here is that the transistors are sufficiently driven to remain conductive. Moreover, the smaller the current gain, or inverted alpha, in the inversely driven transistors, as compared to their normal alpha, the lower the inaccuracy. Thus an almost ideal diode is produced here.

The above-mentioned problem of selecting the largest potential from two or more potentials occurs, for example, in anti-lock control systems for vehicle brakes, in which a variable, proportional to the vehicle speed, is required for measuring the wheel slip. It is known to obtain this variable by assigning a charging capacitor to at least two wheels, each of which capacitors is fed a voltage of unchanging polarity and having an amplitude proportional to the wheel speed and which capacitors can follow the voltage increases practically without delay. Discharge of the capacitor is effected either slowly or in dependence on the rotary behavior of the wheel, with different time constants which can be switched in, as described, for example, in German patent application No. 21 42 144.3. Indeed, the voltage of a charging capacitor can be used as an approximation for a voltage proportional to the vehicle speed, but a much better approximation can be obtained if the maximal value of the charging voltages of the capacitors associated with several wheels is used. In order to ensure that there is no essential inaccuracy of the vehicle speed at about 20 km/h (10 volts corresponds to 280 km/h), in accordance with the invention, transistors are used as coupling elements in the above-mentioned circuits, the inaccuracy of which amounts to only about 1 km/h.

Referring now to the drawings, FIG. 1 shows one form of circuit in accordance with the invention in which the circuit has been designed for use in anti-lock controllers for vehicle brakes. An alternating current voltage, the frequency of which is proportional to the wheel speed, is fed to the terminal 1 in this illustrated circuit.

A frequency to voltage transducing circuit 2 produces, from the alternating voltage, a direct voltage which always has a positive polarity and whose amplitude is proportional to the wheel speed. This direct voltage charges a charging capacitor 4 through the collector-emitter path of a transistor 3. The transistor can be rendered non-conducting by means of a diode 6. Then a discharge of the capacitor 4 can only take place through the transistor 7 which discharge has a very large time constant. By contrast, when the inversely driven transistor 3 is conducting and with reducing wheel voltage, the charging capacitor discharges, with a lower time constant, through this transistor 3 through a short resistance, shown in broken lines, in the transducer 2.

A further charging capacitor which, for example, is associated with another wheel, is given the reference numeral 4'. To improve the approximation of the behavior of the charging voltage to the vehicle speed, the larger of the two charging voltages is selected. The pnp-transistor 7 and 7' serve for this purpose and are connected by their emitters to one plate or coating of the charging capacitors and, by their collectors, to a common output conductor which leads to an operational amplifier 9.

In an exemplary operative embodiment of the invention use is made of transistors which exhibit an emitter-base voltage drop of the order of +0.7V and the voltage across each of capacitors 4, 4', etc. must be no less than 0.8 ÷ 0.9V to assure that each transistor remains switched-on, or conducting. For convenience a minimum capacitor voltage of 1V can be selected. As long as the voltage across each capacitor does not drop below this value, it is assured that the associated transistor will remain conductive.

In this embodiment, the operating voltage applied across the supply voltage terminals shown at the right side of FIG. 1 was made equal to 8.5V, resulting in a maximum voltage of +7.2V across each capacitor 4, 4', etc.

By increasing the operating voltage it becomes possible to provide an increased range for the potentials applied to the emitters of transistors 7, 7', etc. As noted above, the maximum value which can be employed for the operating value is limited by the requirements of not exceeding the permissible base current of each transistor or reaching the breakdown voltage of the transistors when conducting in inverted operation.

The bases of these transistors 7 and 7' are grounded through resistances 8 and 8' respectively. Thus the larger potential is coupled, by way of the upper capacitor plate or coating, to the operational amplifier 9 practically without any voltage drop since the associated transistor is experiencing forward, or normal, operation. The other transistor is then experiencing inverted operation, i.e. a current flows through it from the collector to the emitter. This current is limited by the value of the inverted current gain, $\alpha_I$, of the transistor (e.g. $\alpha_I$ smaller than 1/10) when driven inversely.

If, for example, the upper terminal 21 of the charging capactor 4 has a higher potential then the corresponding terminal 22 of the capacitor 4', this potential is coupled to the input of the operational amplifier 9. Then current flows through the transistor 7' from the collector to the emitter. In order to prevent disturbances of the time constants, the extreme value formation can be undertaken after the operational amplifier is connected to the capacitors.

The above-described circuit is suitable for the formation of variables proportional to the speed of a vehicle, with the illustrated combination of the coupling, in accordance with the invention, where the charging of the charging capacitor and discharge at different discharge time constants are of particular interest. More details of the switching of the transistor 3 and the dimensioning of the discharging time constants are disclosed in German patent application No. P 21 42 144.3.

Figure 2:
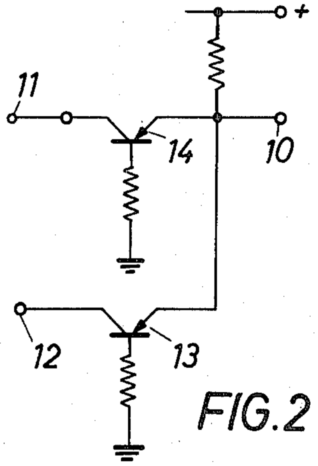
FIG. 2 is a circuit diagram showing a second form of a circuit in accordance with the invention in which the smaller of the input potentials of the circuit is coupled to the output.
Figure 3:
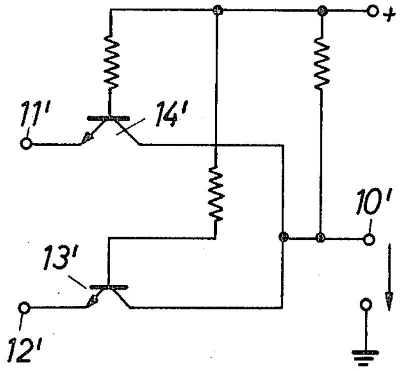
FIG. 3 is a circuit diagram showing a third form of circuit in accordance with the invention, in which again the smaller input potentials of the circuit are coupled to the output.

Two circuits are shown in FIGS. 2 and 3, which both present the smaller of the potentials at the terminals 11 and 12 or 11' and 12' at the terminal 10 or 10' respectively. As the Figures show, transistors with a different conductivity are used in the two examples. For this reason, the bases of these transistors are connected to different poles of the drive voltage. If, in FIG. 2, the potential at the terminal 12 is larger than that at terminal 11, an inverted current flows through the transistor 13, then experiencing inverted operation, and transistor 14 is operated normally. The potential of the terminal 11 is applied to the terminal 10.

Figure 4:
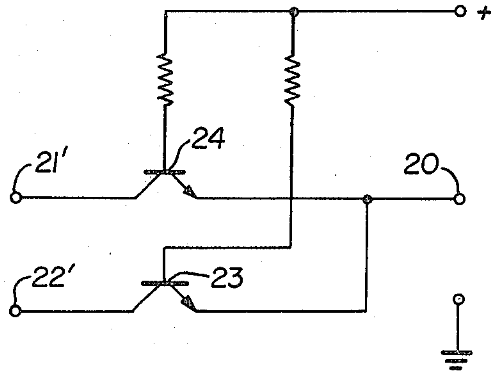
FIG. 4 is a circuit diagram showing a fourth form of circuit in accordance with the invention in which the larger of the input potentials is coupled to the output.

The same applies to transistors 13' and 14' of FIG. 3. A further solution for finding a maximum peak is shown in FIG. 4, with npn-transistors 23 and 24 being connected to input terminals 22' and 21', respectively, and an output potential being provided at terminal 20. As in FIG. 3, the transistor bases are connected to a positive potential.

It will be understood that the above description of the present invention is susceptible to various modification changes and adaptations.

I claim:

1. A circuit for selecting an extreme value from at least two potentials of identical and unchanging polarity and having amplitudes within a given range present on different input conductors comprising a plurality of transistors having an amplification factor greater in the normal direction than in the inverse direction, an output conductor, means for connecting the emitter-collector path of each said transistor between one of said input conductors and said output conductor, means for continuously applying a potential as the only control signal to the bases of said transistors for maintaining said transistors conductive while the amplitudes of the potentials present on the input conductors remain within the given range thereby enabling a current to be conducted along their emitter-collector paths so as to cause normal operation of said transistor carrying the desired extreme value and to cause inverse operation of the other said transistors.

2. A circuit as defined in claim 1 wherein said means for continuously applying a potential to the bases of said transistors comprises: a source of a constant reference potential; and a plurality of resistances each connected between said source and the base of a respective one of said transistors.

3. A circuit as defined in claim 1 wherein the potential applied to the bases of said transistors is given a value determined by the limits of the given range for the potentials present on the different input conductors.

4. A circuit as defined in claim 1 wherein the emitter-collector path of each said transistor presents substantially the only electrical impedance along the path between the point where such potential is applied to the associated input conductor and extending to the connection to said output conductor.

5. A circuit as defined in claim 1 wherein said transistors are of a polarity type such that the conductivity-type of their emitters is of the same polarity as the potentials present on the input conductors.

* * * * *